United States Patent
Kelleher et al.

(10) Patent No.: US 12,281,741 B2
(45) Date of Patent: Apr. 22, 2025

(54) AIR BLOCK CAP FOR DRAIN PAN FITTING AND ASSOCIATED METHOD

(71) Applicant: Brian Patrick Kelleher, Richmond, VA (US)

(72) Inventors: Brian Patrick Kelleher, Richmond, VA (US); Paul Maguire, Goochland, VA (US)

( * ) Notice: Subject to any disclaimer, the term of this patent is extended or adjusted under 35 U.S.C. 154(b) by 392 days.

(21) Appl. No.: 17/901,123

(22) Filed: Sep. 1, 2022

(65) Prior Publication Data

US 2023/0392742 A1    Dec. 7, 2023

Related U.S. Application Data

(60) Provisional application No. 63/348,606, filed on Jun. 3, 2022.

(51) Int. Cl.
*F16L 55/115* (2006.01)
*F16L 55/10* (2006.01)

(52) U.S. Cl.
CPC ......... *F16L 55/115* (2013.01); *F16L 55/1011* (2013.01)

(58) Field of Classification Search
CPC ........................... F16K 13/04; Y10T 137/1624
USPC ......... 138/89, 90; 220/89.1; 137/910, 68.19, 137/68.21, 68.27, 68.28
See application file for complete search history.

(56) References Cited

U.S. PATENT DOCUMENTS

| | | | |
|---|---|---|---|
| 2,798,503 A | | 7/1957 | Carver et al. |
| 4,102,469 A | * | 7/1978 | Shegrud .................. F16K 17/16 220/89.2 |
| 4,357,960 A | * | 11/1982 | Han ..................... F16L 55/1608 138/97 |
| 4,607,664 A | * | 8/1986 | Carney ................... F16L 55/10 137/910 |
| 4,662,048 A | * | 5/1987 | Carney ............... F16L 55/1011 29/890.141 |
| 4,739,799 A | * | 4/1988 | Carney .................. F16K 13/04 137/67 |
| 5,012,945 A | * | 5/1991 | Keenan ................... F16K 17/16 137/71 |
| 5,121,847 A | * | 6/1992 | Ellis .................... F16K 17/1633 220/203.08 |
| 5,186,214 A | * | 2/1993 | Savard ................. F16L 55/1116 228/119 |
| 5,318,075 A | * | 6/1994 | Roll ........................ F16L 55/11 138/91 |
| 6,619,326 B1 | | 9/2003 | Pryne |

(Continued)

*Primary Examiner* — David R Deal
(74) *Attorney, Agent, or Firm* — Keefe IP Law, PLLC (57) ABSTRACT

A cap covers an open end of a drain pan fitting of an appliance drain pan. The cap comprises a cylindrical body and a non-planar water-soluble membrane. The cylindrical body has a first end with a first end opening, a second end with a second end opening, and a longitudinal through-hole extending between the first end opening and the second end opening. The non-planar water-soluble membrane is positioned to at least partially obstruct the through-hole when the membrane is intact such that air flow through the through-hole is inhibited in the absence of water in the drain pan. The membrane is adapted to dissolve when exposed to water in the drain pan such that water in the drain pan is not inhibited from exiting the drain pan through the through-hole.

40 Claims, 8 Drawing Sheets

(56) References Cited

U.S. PATENT DOCUMENTS

| | | | |
|---|---|---|---|
| 6,948,515 B2 * | 9/2005 | Wadkins | F16K 17/1633 |
| | | | 220/89.2 |
| 7,992,230 B2 | 8/2011 | Millard | |
| 8,967,176 B2 | 3/2015 | Connor | |
| 9,293,792 B2 | 3/2016 | Grace et al. | |

* cited by examiner

AIR BLOCK CAP FOR DRAIN PAN FITTING AND ASSOCIATED METHOD

CROSS-REFERENCE TO RELATED APPLICATIONS

This application claims priority to pending U.S. Provisional Application Ser. No. 63/348,606, filed Jun. 3, 2022, the contents of which are incorporated herein by reference in its entirety.

FIELD OF THE INVENTION

This invention relates generally to drains, drain pans, and drain pan fittings.

BACKGROUND

Figure 1:
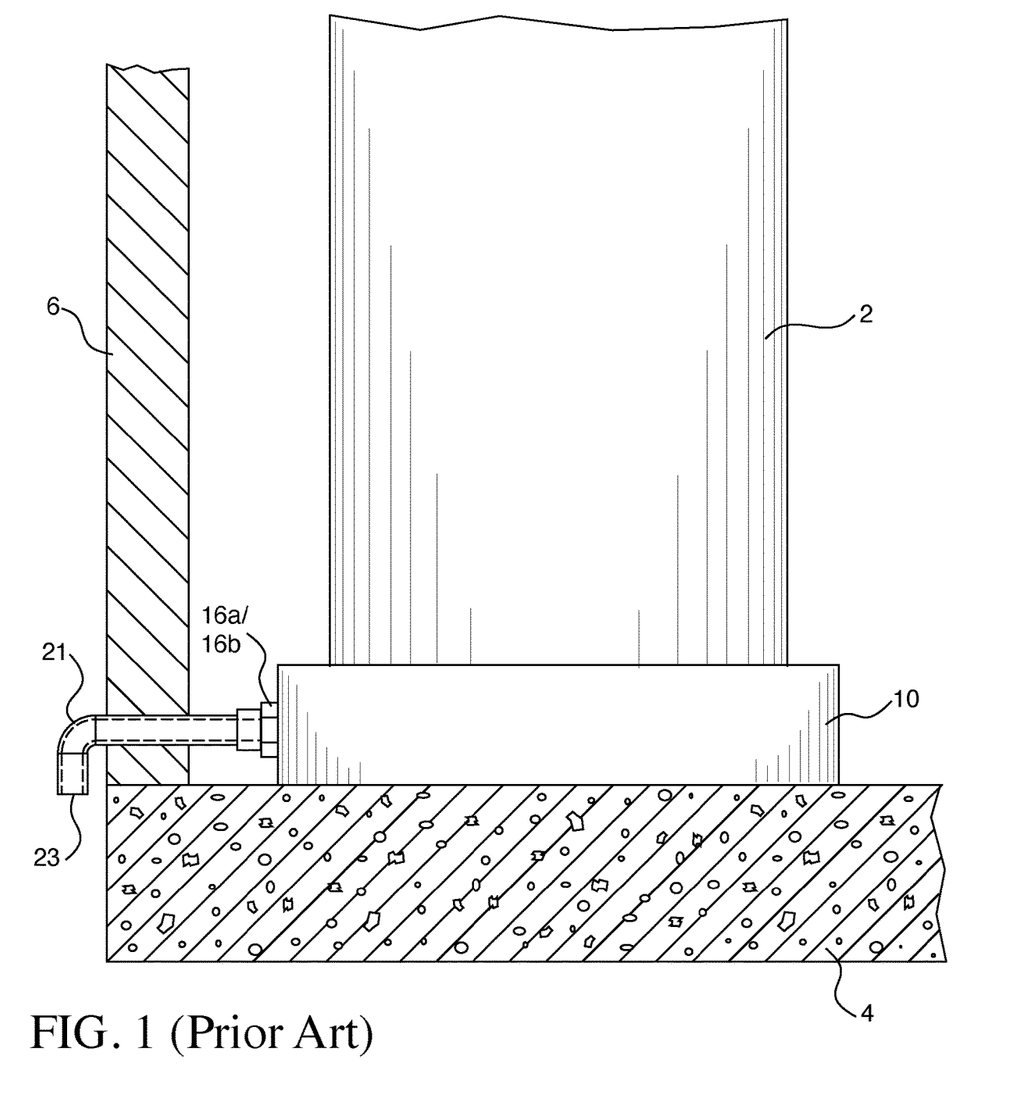
FIG. 1 is a side view of a water heater in a conventional appliance drain pan with drain pan fitting and drain line.

Appliances that use water, such as washing machines, water heaters, dishwashers, ice makers, etc., sometimes leak water. Leaking water can cause significant damage to the building in which such an appliance is housed if the leaking water is not properly collected and drained away safely (e.g., channeled out of the building). For this reason, it is prudent (and required by the building code in some jurisdictions) to place such appliances in a drain pan that can collect any leaking water, and to attach a drain pipe or hose to the drain pan to channel any collected leaking water out of the building. Such a drain pan, most commonly used with washing machines and water heaters, is typically a shallow basin constructed of any suitable material (typically plastic or metal) and sized to receive the appliance. There is typically a pre-punched hole in a side wall (or the bottom) of the drain pan, through which the collected water may drain. The use of a drain pan is illustrated in FIG. 1. FIG. 1 shows a drain pan 10 sitting on a floor 4 of a building. A water heater 2 sits in the drain pan 10. A drain pan fitting 16a/16b (described further below) is attached to the drain pan 10. The drain pan fitting 16a/16b is connected to a drain pipe 21 which protrudes through a wall 6 of the building. Water that leaks from the water heater 2 collects in the drain pan 10 until the water reaches the level of the drain pan fitting 16a/16b. The water then is channeled out of the drain pan 10 through the drain pan fitting 16a/16b and the drain pipe 21 and out the distal opening 23 of the drain pipe 21.

Figure 2:
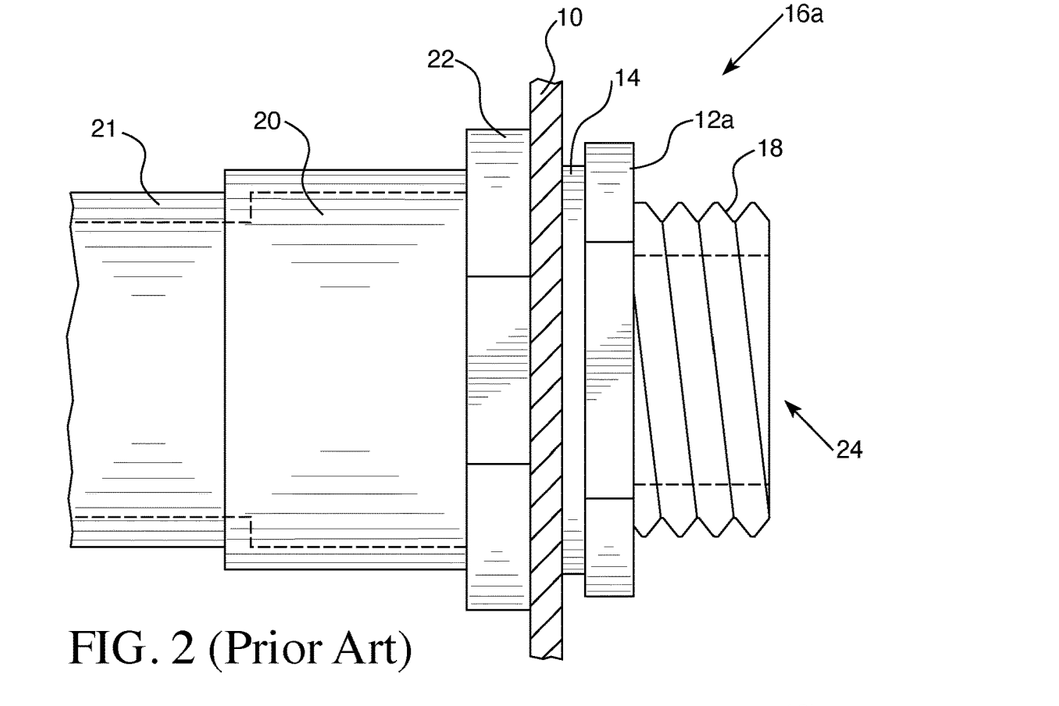
FIGS. 2 and 3 are side views of conventional drain pan fittings to enable water to drain out of a drain pan.
Figure 3:
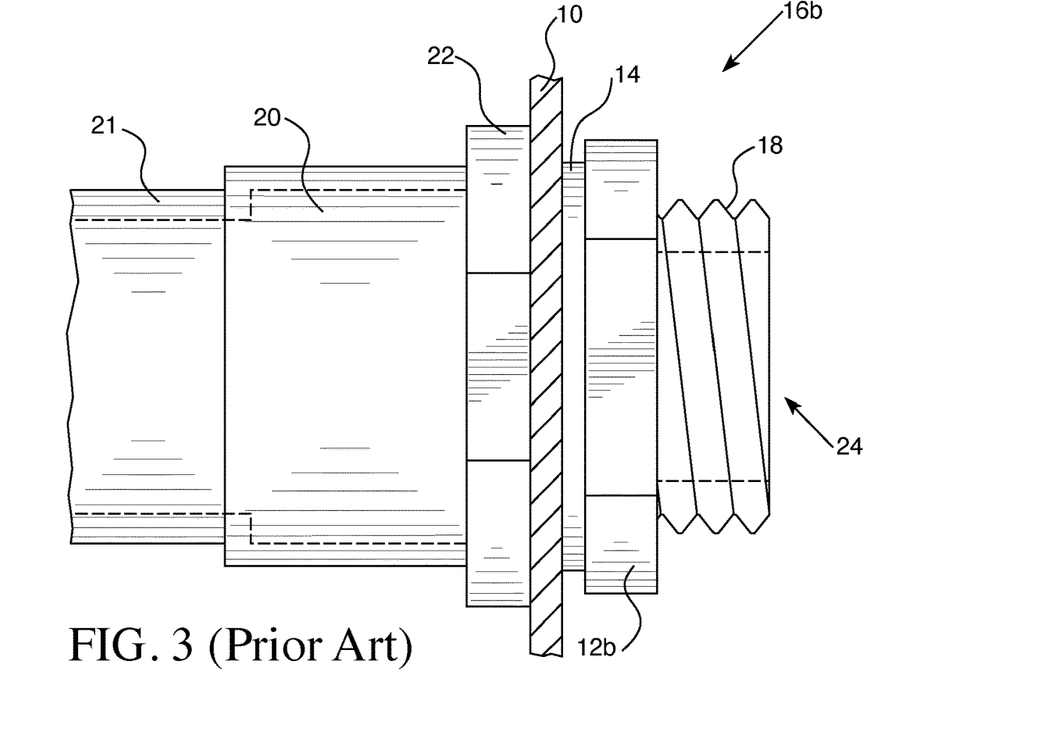

To attach a drain pipe to a drain pan typically requires a drain pan fitting, as illustrated in detail in FIGS. 2 and 3. A conventional drain pan fitting 16a (shown in FIG. 2) or 16b (shown in FIG. 3) comprises a female pipe segment 20, a hexagonal (typically) collar 22, and a male threaded portion 18 (which is shown in FIGS. 6-10 as cutaway). A throughhole or bore 24 is defined longitudinally through the drain pan fitting 16a/16b. Such a drain pan fitting is typically, but not necessarily, constructed of polyvinyl chloride (PVC). Such a drain pan fitting may be sold with or separately from a drain pan. To attach the drain pan fitting 16a/16b to the drain pan 10 (a portion of a side wall of which is illustrated in FIGS. 2, 3 and 6-10), the male threaded portion 18 is inserted through the hole in the side wall of the drain pan 10 from the exterior until the hexagonal collar 22 rests against the exterior surface of the wall of the drain pan 10. From the interior of the drain pan 10, a seal or gasket 14 (typically constructed of rubber or the like) is placed over the male threaded portion 18 and pushed up against the interior surface of the wall of the drain pan 10. A female threaded nut 12a (shown in FIG. 2) or 12b (shown in FIG. 3) is then threaded onto the male threaded portion 18 and tightened against the gasket 14. As shown in FIGS. 2 and 3, there are commonly two different types of female threaded nuts used with drain pan fittings. FIG. 2 shows the thinner type of nut 12a, which is typically constructed of metal, while FIG. 3 shows the thicker type of nut 12b, which is typically constructed of plastic. When the thicker nut 12b is used, less of the male threaded portion 18 is exposed. The female threaded nut 12a/12b is typically hexagonal which, in conjunction with the hexagonal collar 22 of the drain pan fitting 16, enables a user to attach a wrench to each of the two hexagonal structures to apply opposing rotational forces to sufficiently tighten the nut 12a/12b, thereby securing the drain pan fitting 16a/16b to the wall of the drain pan 10. A drain pipe 21 (typically, but not necessarily, constructed of PVC) is attached to the female pipe segment 20, typically using PVC glue. The drain pipe typically runs from the drain pan fitting 16a/16b, through an exterior wall 6, to the exterior of the building.

Because the drain pipe runs from the interior to the exterior of the building, an unobstructed pathway is provided for unconditioned air and pests (e.g., insects, mice, and snakes) to enter the building through the drain pipe and drain pan fitting. While such an unobstructed pathway is important for any leaking water to be quickly directed out of the building, the influx of unconditioned air is detrimental to the energy efficiency of the building and the intrusion of pests is undesirable to the occupants of the building.

BRIEF SUMMARY OF THE DISCLOSURE

In one embodiment of the invention, a cap covers an open end of a drain pan fitting of an appliance drain pan. The cap comprises a cylindrical body and a non-planar water-soluble membrane. The cylindrical body has a first end with a first end opening, a second end with a second end opening, and a longitudinal through-hole extending between the first end opening and the second end opening. The non-planar water-soluble membrane is positioned to at least partially obstruct the through-hole when the membrane is intact such that air flow through the through-hole is inhibited in the absence of water in the drain pan. The membrane is adapted to dissolve when exposed to water in the drain pan such that water in the drain pan is not inhibited from exiting the drain pan through the through-hole.

The cylindrical body may be adapted to attach to an interior end of the drain pan fitting. The second end opening of the cylindrical body may be adapted to receive the interior end of the drain pan fitting. The second end opening of the cylindrical body may be sized to provide a friction fit over the interior end of the drain pan fitting.

The cylindrical body may be a first cylindrical body. The cap may further comprise a second cylindrical body having a first end with a first end opening, a second end with a second end opening, and a longitudinal through-hole extending between the first end opening and the second end opening. The second cylindrical body may be sized to fit over the first cylindrical body such that the second end of the second cylindrical body extends past the second end of the first cylindrical body. The second end opening of the second cylindrical body may be adapted to receive a nut secured onto the interior end of the drain pan fitting. The second end opening of the second cylindrical body may be sized to provide a friction fit over the nut, such that the second cylindrical body is adapted to hold the first cylindrical body in position relative to the interior end of the drain pan fitting.

The cylindrical body may be adapted to attach to a nut secured onto an interior end of the drain pan fitting. The second end opening of the cylindrical body may be adapted to receive the nut. The second end opening of the cylindrical body may be sized to provide a friction fit over the nut.

The membrane may comprise one or more circular pleats formed therein. A plurality of micro-perforations may be defined in the membrane. The micro-perforations may have a round shape, a linear shape, an arcuate shape, or combinations thereof.

The membrane may comprise a generally cylindrical portion having an open end closer to the first end of the cylindrical body and a closed end closer to the second end of the cylindrical body. One or more circumferential pleats may be formed in the generally cylindrical portion. One or more circular pleats may be formed in the closed end. A plurality of micro-perforations may be defined in the closed end. The micro-perforations may have a round shape, a linear shape, an arcuate shape, or combinations thereof.

The membrane may comprise one or more weakened areas adapted to dissolve more quickly than any non-weakened areas when the membrane is exposed to water in the drain pan. The one or more weakened areas may comprise one or more pleats, ridges, micro-perforations, or combinations thereof. The one or more weakened areas may comprise ridges formed in an X shape. The one or more weakened areas may comprise a plurality of ridges extending radially.

Alternative embodiments of the invention may comprise cap for covering an open end of a drain pan fitting of an appliance drain pan. The cap comprises a cylindrical body and a water-soluble membrane. The cylindrical body has a first end with a first end opening, a second end with a second end opening, and a longitudinal through-hole extending between the first end opening and the second end opening. The water-soluble membrane is positioned to at least partially obstruct the through-hole when the membrane is intact such that air flow through the through-hole is inhibited in the absence of water in the drain pan. The membrane is adapted to dissolve when exposed to water in the drain pan such that water in the drain pan is not inhibited from exiting the drain pan through the through-hole. The membrane comprises one or more weakened areas adapted to dissolve more quickly than any non-weakened areas when the membrane is exposed to water in the drain pan.

Alternative embodiments of the invention may comprise a method of inhibiting air flow through an open end of a drain pan fitting of an appliance drain pan in the absence of water in the drain pan while enabling water in the drain pan to exit the drain pan through the drain pan fitting. The method comprises covering the open end of the drain pan fitting with a cap as described herein.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper," "top," and the like designate directions in the drawings to which reference is made. The words "inwardly," "outwardly," "upwardly," "downwardly," and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the present invention provide a novel air block cap for use with a conventional drain pan fitting. The air block cap (or simply "cap") has a water-soluble seal that partially or completely obstructs the bore of the drain pan fitting to inhibit intrusion of unconditioned air and pests when water is not present in the drain pan (such that the seal is intact) but that quickly dissolves when the seal comes in contact with leaking water to enable the leaking water to pass through the bore of the cap and therefore the bore of the drain pan fitting and be channeled safely away. The water-soluble seal may have any suitable shape, contour, or thickness(es). The water-soluble seal may be planar or non-planar. The water-soluble seal may completely span and therefore fully obstruct the bore, but one or more small gaps or openings may be acceptable or even desirable (such as one or more micro-perforations to enhance performance, as described below). The air block cap with the water-soluble seal may be secured to the drain pan fitting using any suitable mechanism or method. The water-soluble seal may be constructed of any suitable material that is sufficiently strong when not exposed to water (such as to prevent intrusion of unconditioned air and/or pests) but that dissolves sufficiently quickly when exposed to water. In one exemplary embodiment of the invention, the seal is constructed from a sheet of polyvinyl alcohol (PVA), typically about 0.005-0.010 inches thick. For simplicity, the water-soluble seal will be referred to herein as a membrane, a PVA seal, or simply a seal.

Embodiments of the invention may also comprise a novel drain pan fitting that has such a water-soluble seal (i.e., there is not a separate cap) to provide the functionality described herein. Embodiments of the invention may also comprise methods for draining leaking water from a drain pan but also inhibiting intrusion of unconditioned air and/or pests when there is no water present in the drain pan.

In its simplest form (not illustrated), the air block cap of embodiments of the invention has a planar (i.e., the portion of the seal that spans the bore of the cap is planar) water-soluble seal that is positioned anywhere along and generally perpendicular to the longitudinal axis of the bore of the cap. The seal may be positioned at the interior opening or the exterior opening of the bore, although it may be desirable to have the seal positioned partially or fully within the bore to help prevent accidental mechanical damage to the seal.

However, a planar seal may not perform optimally. Therefore, some embodiments of the invention comprise a water-soluble seal that is non-planar (i.e., the portion of the seal that spans the bore of the cap is not planar) in any way (including but not limited to the non-planar seals described herein). As described further below, such non-planarity may cause the membrane to (at least partially) dissolve faster than a planar membrane, resulting in a quicker initiation of water drainage from the drain pan. In addition to the membrane being non-planar in some embodiments, the membrane may also be dynamic in that the membrane deforms under the physical weight/pressure of the water. This deformation is advantageous because it physically stretches the membrane causing the already weakened areas of the membrane to become even thinner and dissolve/break faster.

Figure 4A:
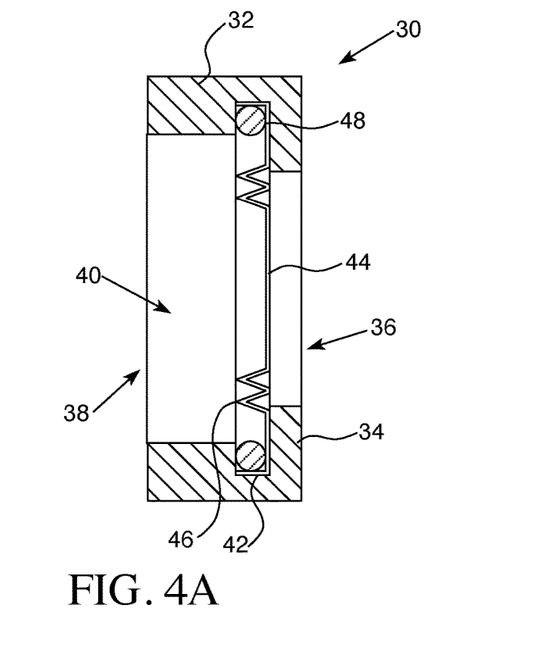
FIGS. 4A and 4B are, respectively, sectional side views of an air block cap and adapter for a drain pan fitting, in a separated arrangement, in accordance with embodiments of the invention.
Figure 4B:
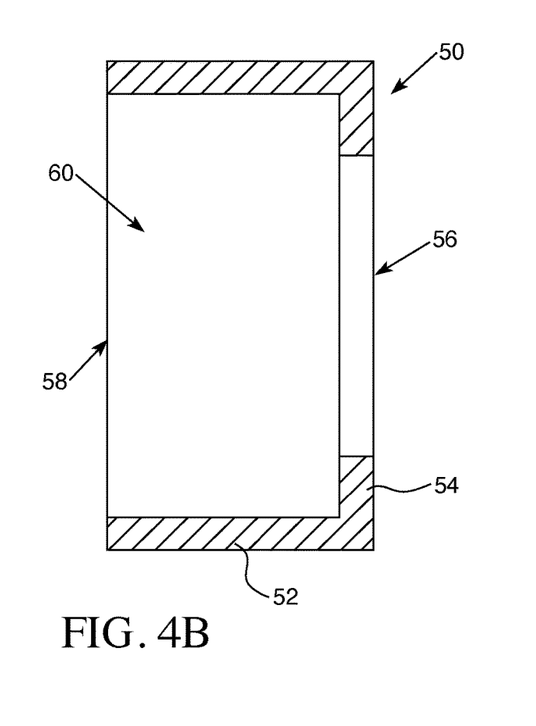

Referring now to the figures, FIG. 4A illustrates an air block cap 30 that may be used to cover the open end (typically the open end that is within the drain pan, which may be termed the interior or proximal end) of a conventional drain pan fitting (or any similar opening that may benefit from blocking the opening with a water-soluble membrane). As described further below, FIG. 4B illustrates an adapter 50 for the air block cap 30. The cap 30 may be used alone (without the adapter 50) in some applications and is used in combination with the adapter 50 in other applications.

Air block cap 30 comprises a hollow cylindrical body 32 having a first open end 36 and a second open end 38 with a through-hole 40 therebetween. The first open end 36 has a smaller diameter than the through-hole 40 such that a circumferential shoulder 34 is formed. Just below the shoulder 34 is an area with a larger diameter, thereby forming a circumferential slot 42. A water-soluble membrane 44 is positioned to obstruct (at least partially) the through-hole 40 when the membrane 44 is intact such that air flow through the through-hole 40 is inhibited in the absence of water in the drain pan 10. Because the membrane 44 is water-soluble, the membrane 44 dissolves when exposed to water in the drain pan (such as might be coming from a leak in the water heater 2). such that water in the drain pan is not inhibited from exiting the drain pan through the through-hole. The membrane 44 is generally circular such that the membrane fully obstructs the through-hole 40. The membrane 44 is secured in the cylindrical body 32 by securing the perimeter of the membrane 44 within the slot 42 by an O-ring 48 or the like.

The membrane 44 has a planar center section (unlabeled) and one or more (two are shown) concentric circular pleats 46 surrounding the planar center section. The formation of the pleats 46 creates thinner areas in the membrane (at the peak of each pleat) for faster dissolution. Any suitable number of pleats may be used, and the height, width, and spacing of the pleats may vary as needed to provide the desired speed of solubility of the membrane.

The membrane 44 of the embodiment of FIG. 4A is very close to the second open end 36. One advantage of this placement is that the membrane is readily visible by the homeowner or service technician. The high visibility enables a homeowner to confirm that the membrane is intact and that there was not a water-based event that caused the membrane to dissolve, thus avoiding the need for more complicated inspection (such as removal of the cap) that may result in damage to the membrane.

The cap 30 may be used alone on the drain pan fitting 16a with the thinner nut 12a, since a sufficient amount of the male threaded portion 18 is exposed to enable attachment of the cap 30 to the male threaded portion 18. When the thicker nut 12b is used and less of the male threaded portion 18 is exposed, the cap 30 typically cannot be attached to the drain pan fitting unless the adapter 50 is also used.

As seen in FIG. 4A, the adapter 50 comprises a hollow cylindrical body 52 having a first open end 56 and a second open end 58 with a through-hole 60 therebetween. The first open end 56 has a smaller diameter than the through-hole 60 such that a circumferential shoulder 54 is formed. The adapter 50 is sized to fit over the cap 30 as shown in FIG. 5 such that the entire cap 30 fits (not necessarily snugly, but preferably with little or no side-to-side movement) within the adapter 50 with a portion of the adapter 50 (on the left side of FIG. 5) extending beyond the body of the cap 30.

For simplicity and clarity, FIGS. 6-10 include some components that are in cross-section (the air block cap and the male threaded portion of the drain pan fitting) and some that are not.

Figure 6:
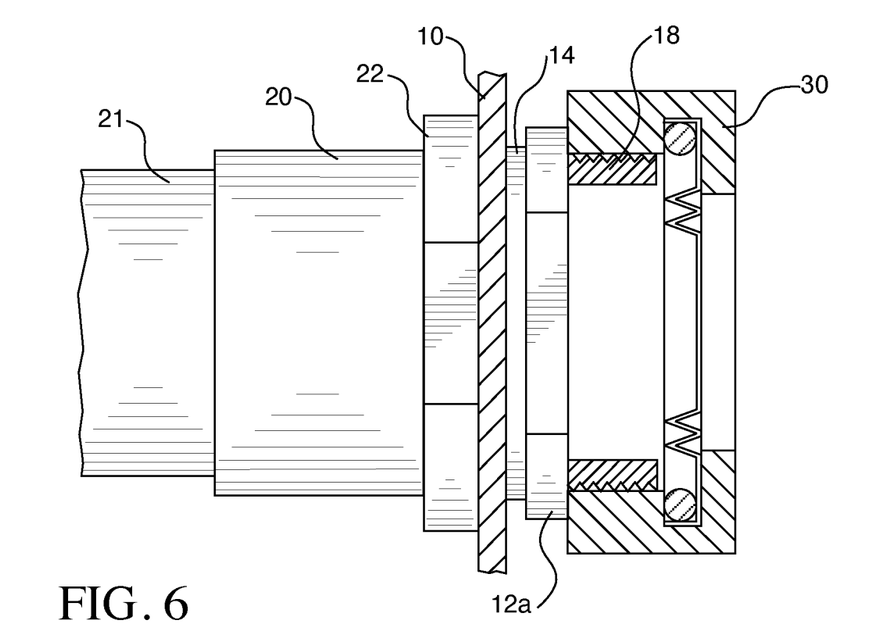
FIG. 6 is a combination side and side sectional view of the air block cap of FIG. 4A in use attached to the drain pan fitting of FIG. 2.

FIG. 6 illustrates the air block cap 30 of FIG. 4A in use with the drain pan fitting 16a of FIG. 2 (i.e., the drain pan fitting with the thinner nut 12a). The cap 30 is placed over the interior end (i.e., the end within the drain pan 10) of the male threaded portion 18 of the drain pan fitting 16a such that the second end opening 38 of the cylindrical body 32 receives the interior end. The second end opening 38 of the cylindrical body 32 is sized to provide a friction fit over the interior end of the drain pan fitting to keep the cap 30 in place attached to the drain pan fitting (the friction fit does not need to be very tight as this attachment does not need to be very strong). In an alternative embodiment (not illustrated), the inside wall of the cylindrical body 32 could be female threaded such that the cap 30 threads onto the threaded portion 18 of the drain pan fitting 16a.

Figure 5:
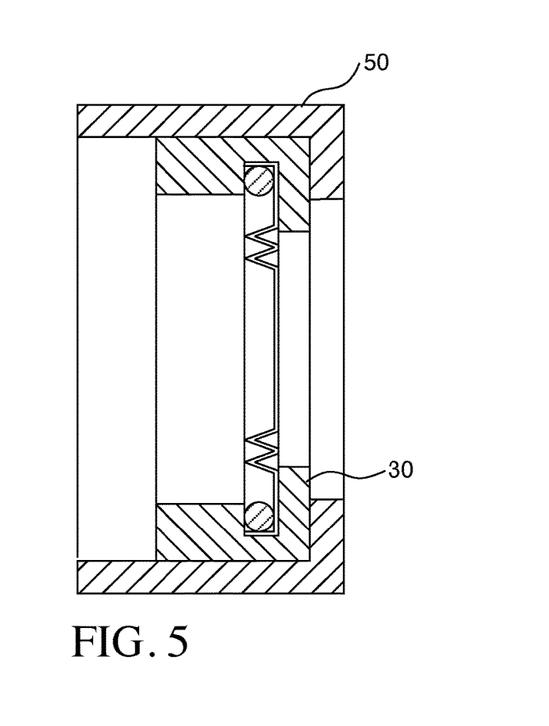
FIG. 5 is a sectional side view of the air block cap and adapter of FIGS. 4A and 4B, in a mated arrangement.
Figure 7:
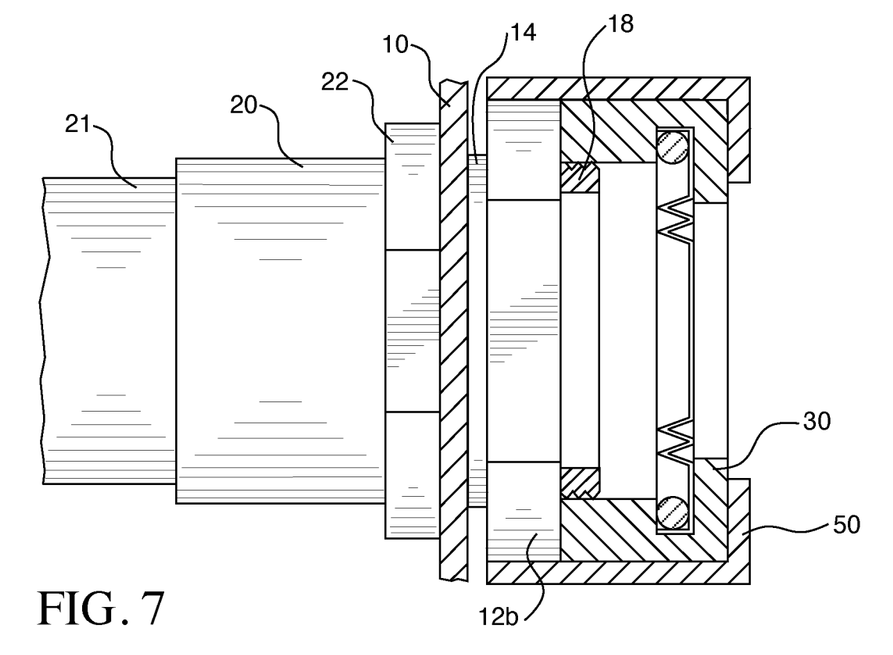
FIG. 7 is a combination side and side sectional view of the air block cap and adapter of FIGS. 4A and 4B in use attached to the drain pan fitting of FIG. 3.

FIG. 7 illustrates the mated air block cap 30 and the adapter 50 of FIG. 5 in use with the drain pan fitting 16b of FIG. 3 (i.e., the drain pan fitting with the thicker nut 12b). The mated cap 30 and adapter 50 is placed over the interior end (i.e., the end within the drain pan 10) of the male threaded portion 18 of the drain pan fitting 16b such that the second end opening 58 of the cylindrical body 52 of the adapter 50 receives the nut 12b. The second end opening 58 of the cylindrical body 52 of the adapter 50 is sized to provide a friction fit over the nut 12b of the drain pan fitting to keep the mated cap 30 and adapter 50 in place attached to the drain pan fitting (the friction fit does not need to be very tight as this attachment does not need to be very strong).

Although the mated cap 30 and adapter 50 are described herein as two separate components that may be joined together as needed, alternative embodiments of the invention may comprise a unitary component that provides the described functionality (i.e., attaching to either the male threaded end or the nut) of the mated cap 30 and adapter 50.

Figure 8:
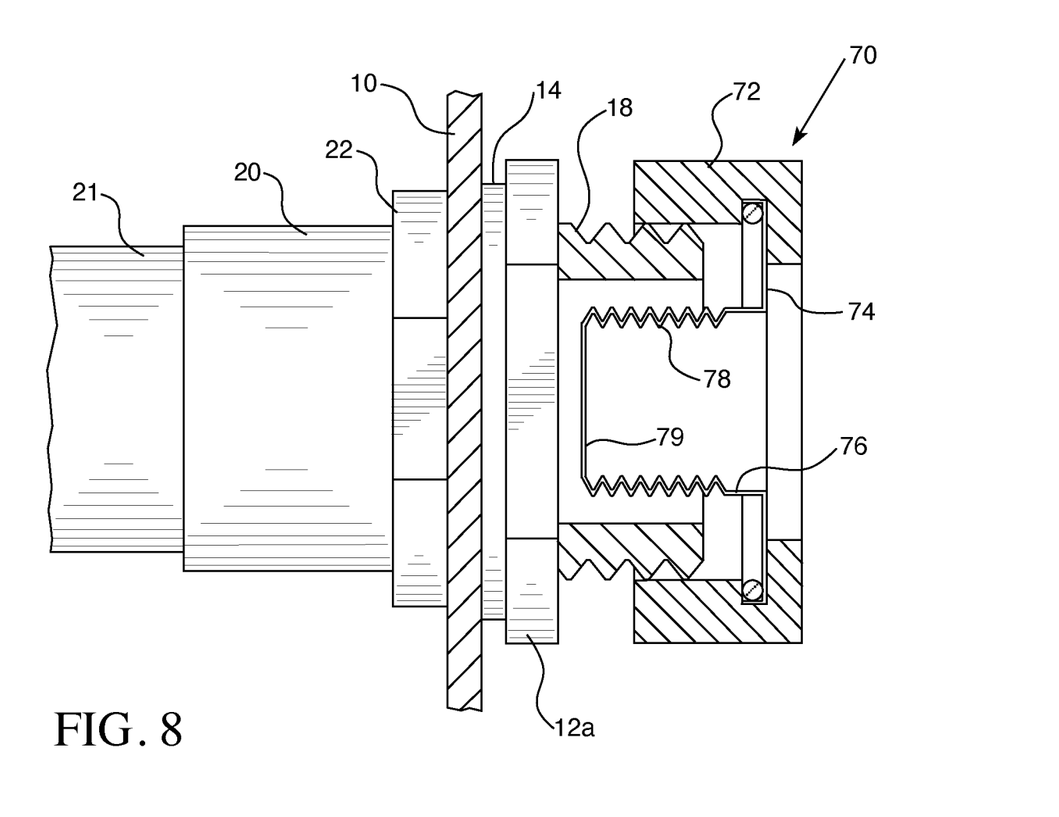
FIGS. 8-10 are combination side and side sectional views of an air block cap in use attached to the drain pan fitting of FIG. 2, in accordance with alternative embodiments of the invention.
Figure 9:
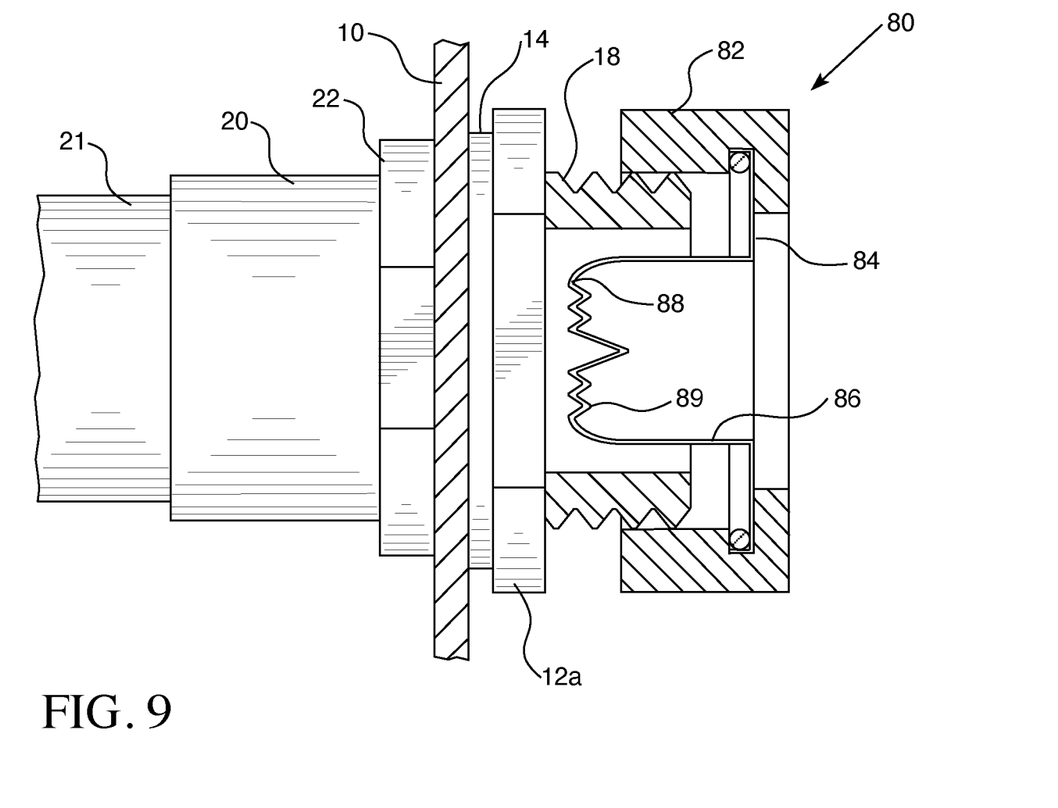
Figure 10:
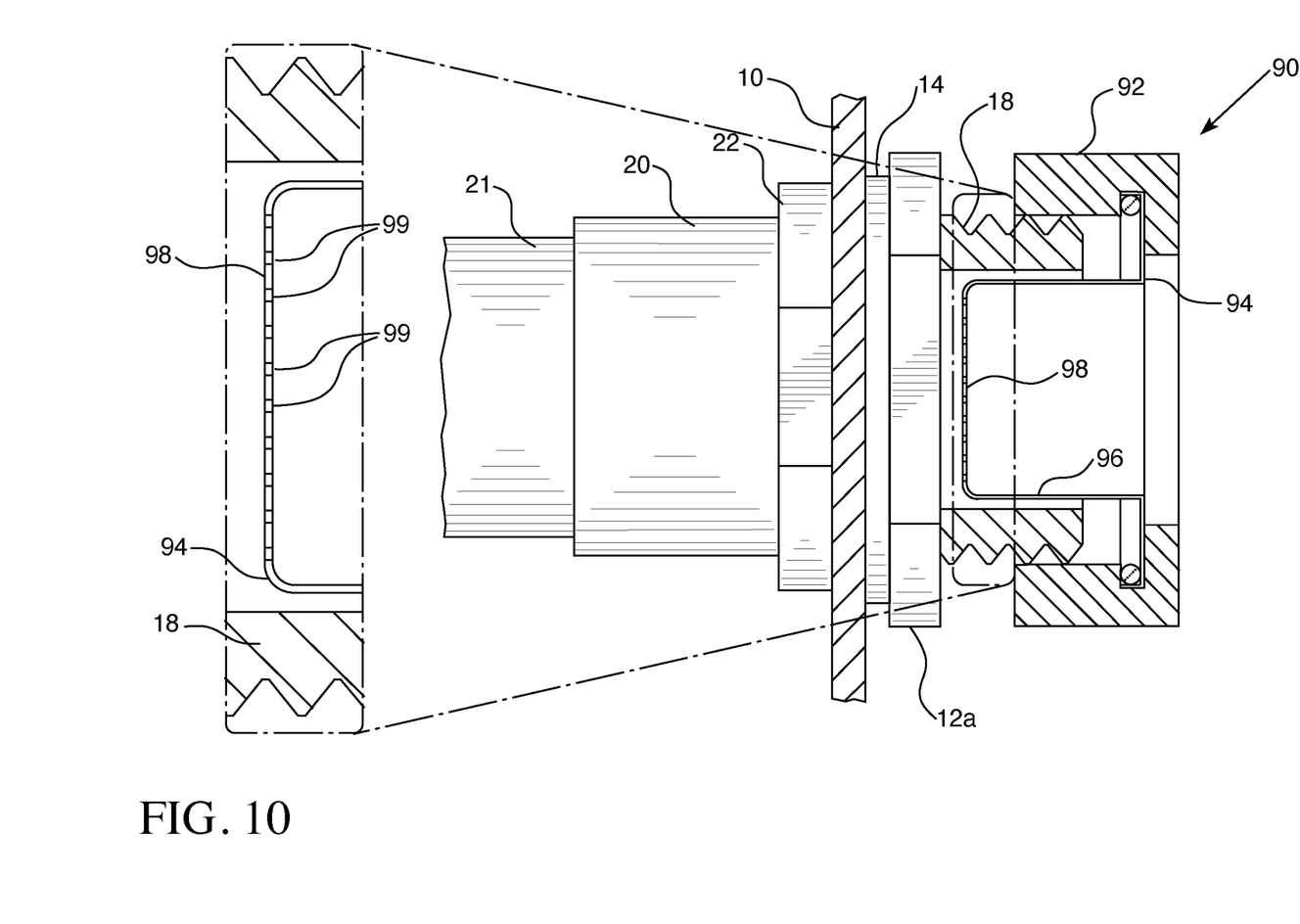

For simplicity and clarity, FIGS. 8-10 illustrate the air block cap not fully installed on the drain pan fitting. This was done so that the entire water-soluble membrane was visible.

FIG. 8 illustrates an air block cap 70 of alternative embodiments of the invention in use with the drain pan fitting 16a of FIG. 2. The cap 70 could be used with the adapter 50 if needed for use with the drain pan fitting 16b of FIG. 3. The cap 70 has a cylindrical body 72 with the same structure and function as the cylindrical body of the cap 30 of FIG. 4A but with a different type of water-soluble membrane. The membrane 74 of FIG. 8 comprises a generally cylindrical wall 76 having an open top end (the end further from the drain pan fitting) and a closed end 79 opposite the open end. As leaking water in the drain pan enters the space within the cylindrical membrane 74, the force and/or weight of the water stretches and thins the side wall which promotes faster dissolution of the membrane 74 (the dissolution of the membrane need only be partial, thereby causing one or more tears in the membrane, to allow sufficient water to pass through the drain pan fitting).

As seen in FIG. 8, a plurality of circumferential pleats 78 may be formed in the cylindrical wall 76 of the membrane 74. The formation of the pleats creates thinner areas in the film (at the peak of each pleat) for faster dissolution. The pleats allow faster and greater expansion of the membrane to further weaken the membrane 74. Pressure from the exterior or distal side of the diaphragm (such as from a pest attempting to enter) may cause the pleats to collapse and create a strong column to resists intrusion of pests.

FIG. 9 illustrates an air block cap 80 of alternative embodiments of the invention in in use with the drain pan fitting 16a of FIG. 2. The cap 80 could be used with the adapter 50 if needed for use with the drain pan fitting 16b of FIG. 3. The cap 80 has a cylindrical body 82 with the same structure and function as the cylindrical body of the cap 30 of FIG. 4A but with a different type of water-soluble membrane. The membrane 84 of FIG. 9 comprises a generally cylindrical wall 86 having an open top end (the end further from the drain pan fitting) and a closed end 88 opposite the open end. A plurality of concentric circular pleats 89 is formed in the closed end 88, as well as a center peak. The formation of the pleats 89 and the center peak creates thinner areas in the membrane (at the peak of each pleat) for faster dissolution. Further, the pleats promote expansion of the membrane due to the weight/pressure of the water. This expansion further stretches, elongates, and thins the weakened areas of the membrane for faster dissolution. Any suitable number of pleats may be used, and the height, width, and spacing of the pleats may vary.

FIG. 10 illustrates an air block cap 90 of alternative embodiments of the invention in in use with the drain pan fitting 16a of FIG. 2. The cap 90 could be used with the adapter 50 if needed for use with the drain pan fitting 16b of FIG. 3. The cap 90 has a cylindrical body 92 with the same structure and function as the cylindrical body of the cap 30 of FIG. 4A but with a different type of water-soluble membrane. The membrane 94 of FIG. 9 comprises a generally cylindrical wall 96 having an open top end (the end further from the drain pan fitting) and a closed end 98 opposite the open end. A plurality of micro-perforations 99 is defined in the closed end 98. Such micro-perforations may be round, linear, arcuate, or combinations thereof. Water flow through the micro-perforations will significantly speed up the rate of dissolution of the membrane. The micro-perforations can be added mechanically or via laser or any other suitable method. The number, size, shape, and spacing of the micro-perforations may vary as needed, but such micro-perforations would typically be less than about 0.2 mm.

Although not illustrated in FIG. 4A or 8, such micro-perforations may be defined in the planar central portion of the membrane 44 of the cap 30 of FIG. 4A or the closed end 79 of the membrane 74 of the cap 70 of FIG. 8.

Although not illustrated, a cylindrical membrane (similar to the membranes of FIGS. 8, 9, and 10) may be provided that does not have any pleats (circular or circumferential) or micro-perforations.

Figure 11A:
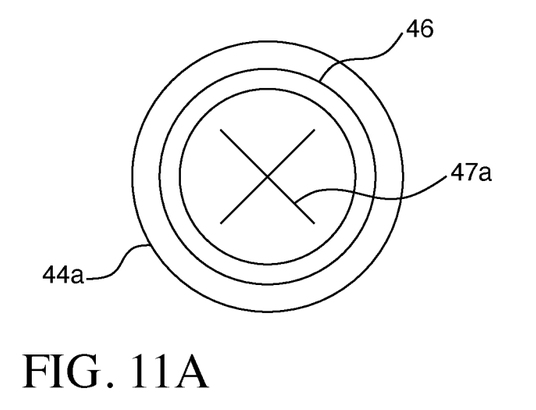
FIGS. 11A and 11B are end views of a water-soluble membrane of an air block cap, in accordance with alternative embodiments of the invention.
Figure 11B:
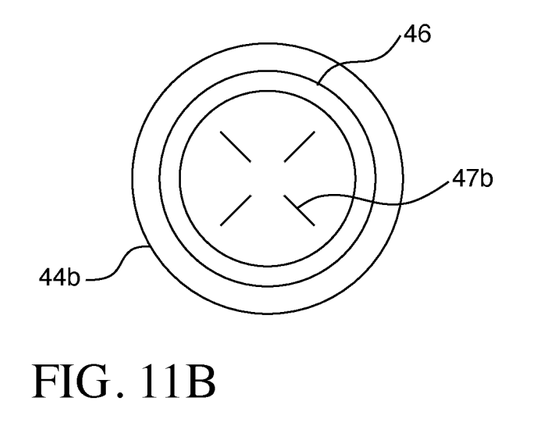

Water-soluble membranes of embodiments of the invention may comprise other means of providing weakened areas of the membrane to promote faster dissolution (other than pleats or micro-perforations). For example, one or more raised linear ridges may be formed in any suitable portion of the membrane. Such raised ridges create thinner areas at the peaks of the ridges. FIG. 11A illustrates an optional membrane 44a (an end portion of which is illustrated) having concentric pleats 46 and raised ridges 47a formed in an X shape. FIG. 11B illustrates an optional membrane 44b (an end portion of which is illustrated) having concentric pleats 46 and raised ridges 47b extending radially outward, forming what may be termed a semi-X.

The X or semi-X pattern (or any other suitable pattern) may be formed as raised ridges (typically on the closed end surface of the membrane) or may be formed by creating a plurality of micro-perforations in the desired pattern. In either case, the pattern of ridges or micro-perforations may allow the water weight to be applied more directly to the end of the membrane and may allow the lines of the X or semi-X pattern to work together to create a faster failure of the membrane. The X pattern may fail faster than the semi-X pattern, but the semi-X pattern may provide better resistance to pest intrusion than the X pattern.

The water-soluble membrane of embodiments of the invention may have any combination of one or more of the features described herein (and/or any other suitable features that may provide the desired functionality), including but not limited to pleats on the sidewall, pleats on the end wall, micro-perforations, and/or patterns.

Embodiments of the invention are described herein as being used with a washing machine drain pan or a water heater drain pan. However, embodiments of the invention may be used with any suitable drain pan, with any suitable drain, or in any suitable situation where water may need to be drained. There are many different ways than are described herein to structure and attach a drain pan fitting. Embodiments of the invention are not limited to use with the specific drain pan fittings described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A cap for covering an open end of a drain pan fitting of an appliance drain pan, the cap comprising:
    a cylindrical body having a first end with a first end opening, a second end with a second end opening, and a longitudinal through-hole extending between the first end opening and the second end opening; and
    a non-planar water-soluble membrane positioned to at least partially obstruct the through-hole when the membrane is intact such that air flow through the through-hole is inhibited in the absence of water in the drain pan;
    wherein the membrane is adapted to dissolve when exposed to water in the drain pan such that water in the drain pan is not inhibited from exiting the drain pan through the through-hole;
    wherein the cylindrical body is adapted to attach to an interior end of the drain pan fitting; and
    wherein the second end opening of the cylindrical body is adapted to receive the interior end of the drain pan fitting.

2. The cap of claim 1, wherein the second end opening of the cylindrical body is sized to provide a friction fit over the interior end of the drain pan fitting.

3. The cap of claim 1, wherein the cylindrical body is a first cylindrical body;
    wherein the cap further comprises a second cylindrical body having a first end with a first end opening, a second end with a second end opening, and a longitudinal through-hole extending between the first end opening and the second end opening;
    wherein the second cylindrical body is sized to fit over the first cylindrical body such that the second end of the second cylindrical body extends past the second end of the first cylindrical body;
    wherein the second end opening of the second cylindrical body is adapted to receive a nut secured onto the interior end of the drain pan fitting; and
    wherein the second end opening of the second cylindrical body is sized to provide a friction fit over the nut, such that the second cylindrical body is adapted to hold the first cylindrical body in position relative to the interior end of the drain pan fitting.

4. The cap of claim 1, wherein the cylindrical body is adapted to attach to a nut secured onto the interior end of the drain pan fitting.

5. The cap of claim 4, wherein the second end opening of the cylindrical body is adapted to receive the nut.

6. The cap of claim 5, wherein the second end opening of the cylindrical body is sized to provide a friction fit over the nut.

7. The cap of claim 1, wherein the membrane comprises one or more circular pleats formed therein.

8. The cap of claim 7, wherein a plurality of micro-perforations is defined in the membrane.

9. The cap of claim 8, wherein the micro-perforations have a round shape, a linear shape, an arcuate shape, or combinations thereof.

10. The cap of claim 1, wherein the membrane comprises a generally cylindrical portion having an open end closer to the first end of the cylindrical body and a closed end closer to the second end of the cylindrical body.

11. The cap of claim 10, wherein one or more circumferential pleats are formed in the generally cylindrical portion.

12. The cap of claim 10, wherein one or more circular pleats are formed in the closed end.

13. The cap of claim 10, wherein a plurality of micro-perforations is defined in the closed end.

14. The cap of claim 13, wherein the micro-perforations have a round shape, a linear shape, an arcuate shape, or combinations thereof.

15. The cap of claim 1, wherein the membrane comprises one or more weakened areas adapted to dissolve more quickly than any non-weakened areas when the membrane is exposed to water in the drain pan.

16. The cap of claim 15, wherein the one or more weakened areas comprise one or more pleats, ridges, micro-perforations, or combinations thereof.

17. The cap of claim 15, wherein the one or more weakened areas comprise ridges formed in an X shape.

18. The cap of claim 17, wherein the one or more weakened areas comprise a plurality of ridges extending radially.

19. A cap for covering an open end of a drain pan fitting of an appliance drain pan, the cap comprising:
    a cylindrical body having a first end with a first end opening, a second end with a second end opening, and a longitudinal through-hole extending between the first end opening and the second end opening; and
    a water-soluble membrane positioned to at least partially obstruct the through-hole when the membrane is intact such that air flow through the through-hole is inhibited in the absence of water in the drain pan;
    wherein the membrane is adapted to dissolve when exposed to water in the drain pan such that water in the drain pan is not inhibited from exiting the drain pan through the through-hole;
    wherein the membrane comprises one or more weakened areas adapted to dissolve more quickly than any non-weakened areas when the membrane is exposed to water in the drain pan;
    wherein the cylindrical body is adapted to attach to an interior end of the drain pan fitting; and
    wherein the second end opening of the cylindrical body is adapted to receive the interior end of the drain pan fitting.

20. The cap of claim 19, wherein the second end opening of the cylindrical body is sized to provide a friction fit over the interior end of the drain pan fitting.

21. The cap of claim 19, wherein the cylindrical body is a first cylindrical body;
    wherein the cap further comprises a second cylindrical body having a first end with a first end opening, a second end with a second end opening, and a longitudinal through-hole extending between the first end opening and the second end opening;
    wherein the second cylindrical body is sized to fit over the first cylindrical body such that the second end of the second cylindrical body extends past the second end of the first cylindrical body;

wherein the second end opening of the second cylindrical body is adapted to receive a nut secured onto the interior end of the drain pan fitting; and wherein the second end opening of the second cylindrical body is sized to provide a friction fit over the nut, such that the second cylindrical body is adapted to hold the first cylindrical body in position relative to the interior end of the drain pan fitting.

22. The cap of claim 19, wherein the cylindrical body is adapted to attach to a nut secured onto the interior end of the drain pan fitting.

23. The cap of claim 22, wherein the second end opening of the cylindrical body is adapted to receive the nut.

24. The cap of claim 23, wherein the second end opening of the cylindrical body is sized to provide a friction fit over the nut.

25. The cap of claim 19, wherein the membrane comprises one or more circular pleats formed therein.

26. The cap of claim 25, wherein a plurality of micro-perforations is defined in the membrane.

27. The cap of claim 26, wherein the micro-perforations have a round shape, a linear shape, an arcuate shape, or combinations thereof.

28. The cap of claim 19, wherein the membrane comprises a generally cylindrical portion having an open end closer to the first end of the cylindrical body and a closed end closer to the second end of the cylindrical body.

29. The cap of claim 28, wherein one or more circumferential pleats are formed in the generally cylindrical portion.

30. The cap of claim 28, wherein one or more circular pleats are formed in the closed end.

31. The cap of claim 28, wherein a plurality of micro-perforations is defined in the closed end.

32. The cap of claim 31, wherein the micro-perforations have a round shape, a linear shape, an arcuate shape, or combinations thereof.

33. The cap of claim 19, wherein the membrane is non-planar.

34. The cap of claim 19, wherein the one or more weakened areas comprise one or more pleats, ridges, micro-perforations, or combinations thereof.

35. The cap of claim 19, wherein the one or more weakened areas comprise ridges formed in an X shape.

36. The cap of claim 35, wherein the one or more weakened areas comprise a plurality of ridges extending radially.

37. A cap for covering an open end of a drain pan fitting of an appliance drain pan, the cap comprising:
 a cylindrical body having a first end with a first end opening, a second end with a second end opening, and a longitudinal through-hole extending between the first end opening and the second end opening; and
 a non-planar water-soluble membrane positioned to at least partially obstruct the through-hole when the membrane is intact such that air flow through the through-hole is inhibited in the absence of water in the drain pan;
 wherein the membrane is adapted to dissolve when exposed to water in the drain pan such that water in the drain pan is not inhibited from exiting the drain pan through the through-hole; and
 wherein the cylindrical body is adapted to attach to a nut secured onto an interior end of the drain pan fitting.

38. The cap of claim 37, wherein the second end opening of the cylindrical body is adapted to receive the nut.

39. The cap of claim 38, wherein the second end opening of the cylindrical body is sized to provide a friction fit over the nut.

40. The cap of claim 37, wherein the membrane comprises one or more circular pleats formed therein.

* * * * *